F. HUMPAL.
MINNOW TRAP AND RECEPTACLE.
APPLICATION FILED MAY 2, 1911.
1,011,347.
Patented Dec. 12, 1911.
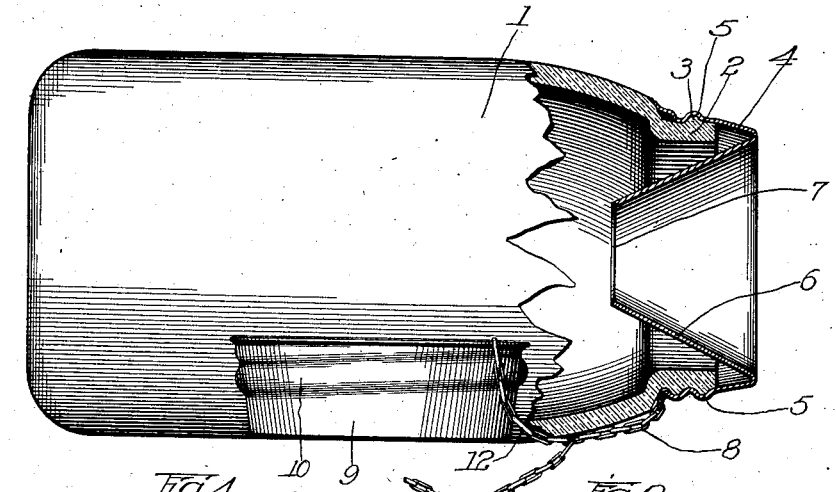
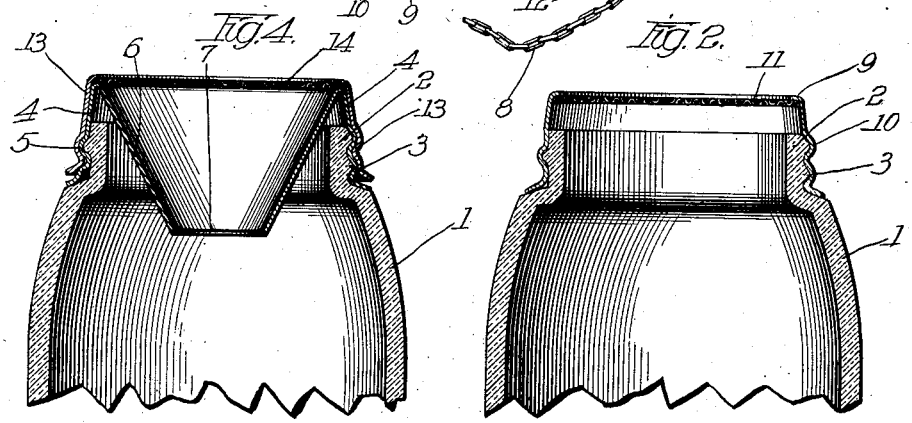
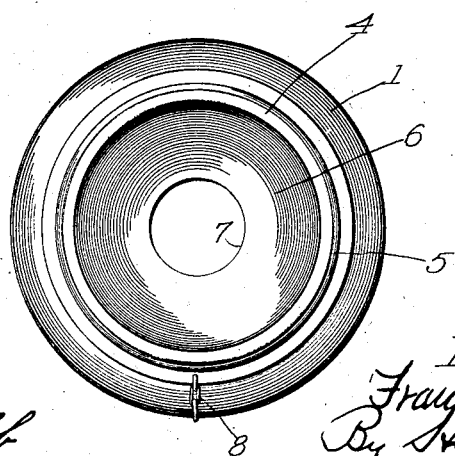

UNITED STATES PATENT OFFICE.

FRANK HUMPAL, OF CHICAGO, ILLINOIS.

MINNOW TRAP AND RECEPTACLE.

1,011,347.  Specification of Letters Patent.  Patented Dec. 12, 1911.

Application filed May 2, 1911.  Serial No. 624,636.

*To all whom it may concern:*

Be it known that I, FRANK HUMPAL, a citizen of the United States, residing at Chicago, in the county of Cook and State of Illinois, have invented certain new and useful Improvements in Minnow Traps and Receptacles, of which the following is a description.

My invention belongs to that general class of devices known as traps, and relates particularly to a trap and receptacle for catching and containing minnows or the like.

The invention has among its objects the production of a simple, convenient, efficient, satisfactory and inexpensive trap and receptacle of the kind described for use wherever it may be found applicable.

The trap is particularly convenient where the user is traveling about, since only a part need be carried, as the remainder may be purchased or secured proximate the place of use.

Another advantage is that the preferred form of receptacle may easily be replaced in the case of breakage, and without delay.

To this end my invention consists in the novel construction, arrangement and combination of parts herein shown and described, and more particularly pointed out in the claim.

In the drawings, wherein like reference characters indicate like or corresponding parts, Figure 1 is a sectional view of my improved trap and receptacle, and a side elevation of the screened closure, the receptacle being shown partially in elevation and partially in section. Fig. 2 is a sectional view of the screened top and a portion of the receptacle. Fig. 3 is a top elevation of the top and receptacle. Fig. 4 is a sectional view of a slightly modified construction.

Referring to the drawings, 1 represents a receptacle provided with a neck 2, and formed with a thread 3, or its equivalent, on the exterior of the neck. For the receptacle I preferably use one of the common and well known forms of glass fruit jars, of suitable size, having the neck of the mouth arranged for engagement with a threaded cap, or its equivalent. In place of the usual cap or top, however, I use what may be termed a "trap", which consists of a shell 4 formed as at 5 to engage the thread 3 upon the neck of the jar. The part 4 is preferably turned inwardly, or provided with an inwardly extending part 6, having an opening 7 at the reduced end, the same being substantially in the form of a funnel or frustum of a cone, open at both ends. The flare or angle of the sides 6 of the funnel may be as desired, depending upon the size of bait for which the trap is designed. If desired a cord or chain 8, or the equivalent, may be secured to the shell 4, affording means for anchoring the device, as well as convenient means for lifting the same. In addition to the funnel-shaped cap 4, I also preferably provide a removable screened cap 9, (see Fig. 2) which is preferably formed as at 10 to engage the top of the receptacle when the trap is removed, the cap 9 being open at the end and covered by a screen 11, or its equivalent for the purpose. If desired, the cap 9 may be secured by a chain 12 to the chain 8, or to the cap 4. However, it is not necessary to secure the two caps together as shown.

In using the trap and receptacle, the part 4 is secured upon the neck 2 of the receptacle, the trap in reality comprising the receptacle 1 and the cap 4 with the funnel 6, and a few bread or cracker crumbs placed in the receptacle. The receptacle is then placed in the water at a spot frequented by minnows, which, attracted by the bait, pass through the opening 7 at the reduced end of the funnel and into the receptacle, and owing to the shape of the same, are contained therein. The chain 8 affords means for securing the receptacle and preventing the same from being washed away, as well as affords a convenient way for raising the trap. When it is desired to lift the trap and receptacle after a sufficient number of minnows have been caught, the same may be removed from the water, and the trap or top 4 be replaced by the cap 9. The cap 9 prevents the minnows from being lost should the jar be accidentally overturned, and also makes it possible for the same to be left in the water, or suspended from a dock or boat. The convenience of the device will be readily appreciated by anyone who has had occasion to use such a device, for in traveling it is only necessary to carry the trap or cap 4 and a cap 9, as the receptacle being the well known and extensively used fruit jar, may be secured at almost any place. If the receptacle or jar is accidentally broken, it is only necessary to go to the nearest store, or generally to the nearest habitation, to procure a new one. In this case the new one can be procured at a slight cost, or a few cents. On the other hand, in case of a specially formed or designed receptacle, in case of accident, it might be necessary to send to some distant point for a new receptacle, thereby making further use of the trap prohibitive until the new receptacle is received. If the user had only a few days at his disposal, it might be impossible to send for and receive a special receptacle within his remaining time. With the applicant's construction, however, it is but a matter of a short time, perhaps a few minutes, before the receptacle can be replaced.

In the modified construction shown in Fig. 4, I have shown the cap 13, which is the equivalent of cap 9, of sufficient size to be screwed upon the outside of the trap or cap 4. It is preferable, however, to remove the cap 4 and place the screened cap directly upon the receptacle rather than upon the cap 4, as the minnows receive more air where the cap 4 is previously removed. It is of course understood that the cap 9 may be provided with any equivalent for the screen 11. By connecting the cap 4 to the cap 9 as shown in Fig. 1, the parts are not as easily lost, or mislaid, as where not connected, and at the same time convenient means is afforded for anchoring or suspending the device in use when either cap is on.

Having thus described my invention, it is obvious that various immaterial modifications may be made in the same without departing from the spirit of my invention, hence I do not wish to be understood as limiting myself to the exact form, construction or combination of parts herein shown and described, or uses mentioned.

What I claim as new and desire to secure by Letters Patent is:—

A trap of the character described and in combination with a receptacle having a neck portion provided exteriorly with a projecting part, a closure for the receptacle having a marginal flange part provided with a projecting portion adapted to engage the projecting part on the receptacle neck and also having a tapered open-ended portion overlapping the edge of the receptacle and projecting inwardly into the neck thereof, and a supplemental closure for fitting the neck of the receptacle provided with a screened end part designed to extend over the end of the neck part.

In testimony whereof, I have hereunto signed my name in the presence of two subscribing witnesses.

FRANK HUMPAL.

Witnesses:
 JAMES J. MELICHAR,
 ADOLPH J. KRASA.

Copies of this patent may be obtained for five cents each, by addressing the "Commissioner of Patents, Washington, D. C."